United States Patent [19]

Tekippe

[11] Patent Number: 4,495,819
[45] Date of Patent: Jan. 29, 1985

[54] OPTICAL PRESSURE SENSOR
[75] Inventor: Vincent J. Tekippe, Des Plaines, Ill.
[73] Assignee: Gould Inc., Rolling Meadows, Ill.
[21] Appl. No.: 452,760
[22] Filed: Dec. 23, 1982
[51] Int. Cl.³ ................................. G01L 9/00
[52] U.S. Cl. ........................................ 73/705; 73/800
[58] Field of Search ................. 73/705, 800, 862.38; 356/33, 34, 35; 350/371

[56] References Cited

U.S. PATENT DOCUMENTS

| | | | |
|---|---|---|---|
| 3,580,082 | 5/1971 | Strack | 73/406 |
| 3,789,667 | 2/1974 | Porter et al. | 73/406 |
| 3,960,448 | 6/1976 | Schmidt et al. | 73/705 |
| 3,969,929 | 7/1976 | Shaw et al. | 73/705 |
| 3,992,095 | 11/1976 | Jacoby et al. | 73/705 |
| 4,078,432 | 3/1978 | Stewart | 73/705 |
| 4,091,280 | 5/1978 | Ellis et al. | 73/705 |
| 4,158,310 | 6/1979 | Ho | 73/705 |
| 4,173,412 | 11/1979 | Ramsay et al. | 356/33 |
| 4,212,198 | 7/1980 | Divine | 73/151 |
| 4,270,050 | 5/1981 | Brogardh | 250/231 |
| 4,295,738 | 10/1981 | Meltz et al. | 73/705 |
| 4,321,831 | 3/1982 | Tomlinson et al. | 73/705 |

OTHER PUBLICATIONS

Wickersheim, K. A. et al., "Optical Temperature Measurement", *Industrial Research/Development*, Dec. 1979.
Spillman, Jr. W. B., "Multimode Fiber-Optic Pressure Sensor Based on the Photoelastic Effect" *Optic Letters*, vol. 7, No. 8, Aug. 1982 (pp. 388-390).

*Primary Examiner*—Donald O. Woodiel
*Attorney, Agent, or Firm*—J. R. Garrett; Edward E. Sachs

[57] ABSTRACT

An optical device for monitoring pressure is described. The device is capable of monitoring pressure in relatively hostile high temperature, high pressure environments through the use of a pressure-sensitive means having an all-glass housing. The subject optical device relies on the photoelastic effect produced when a material is subjected to a uniaxial stress to produce birefringent banding. In the subject device, polychromatic light is modified to produce a signal having wavelength-dependent intensity variations to allow the pressure-sensitive device to monitor pressure over a relatively wide range.

16 Claims, 8 Drawing Figures

OPTICAL PRESSURE SENSOR

BACKGROUND OF THE INVENTION

This invention relates in general to optical pressure sensors, and in particular to a pressure sensor capable of measuring small changes in pressure in a high pressure environment, such as oil well logging.

Typically, pressures are measured in oil wells with various types of electronic equipment. The electronic sensors are sensitive to temperature changes and are slow to recover to equilibrium. In addition, the electronic sensors do not have good long-term stability, and hence they do not have good reliability. Pressure sensors are used in oil wells, particularly in oil wells below the ocean floor to determine the opportune time to pump oil from these reservoirs. Because of the severe environmental conditions which exist in these wells, an extremely stable and reliable pressure sensor is required. The pressure sensors generally have to operate up to a pressure of 10,000 psi, with a resolution of 10 psi and must function at a depth of 15,000 feet below the ocean floor. The ambient temperature at which these pressure sensors must operate is of the order of 200 degrees centigrade.

An optical wave is characterized by its amplitude, phase, and wavelength, and all of these parameters can be used for sensing pressure. A number of optical pressure sensing devices are known in the prior art. Pressure sensors based on the intensity of the light have a limited dynamic range, particularly in a high loss system, and elaborate precautions must be taken to insure that spurious losses in the system are not interpreted as changes in pressure. Interferometric devices have virtually unlimited dynamic range and can measure exceedingly small changes in pressure but are difficult to use in determining absolute pressure. The latter is aggravated by the high susceptibility of such devices to fluctuations in temperature. For example, in a typical optical fiber, the phase change induced by a change in temperature of one degree centigrade exceeds the phase change induced by a change in pressure of 1 psi by a factor of about 200. This same temperature to pressure ratio can exceed several thousand in the case of optical pressure sensors which rely on the change in wavelength for pressure sensing. Therefore, in high pressure environments, the conventional optical pressure sensors utilizing changes in intensity, phase, or wavelength, will not be suitable, especially in a high temperature environment.

In U.S. Pat. No. 4,321,831, issued to Tomlinson et al., an apparatus is disclosed for pressure measurement in which a broad band spectrum of light is polarized and then transmitted through a birefringent plate to a pressure sensitive element, such as lucite. The intensity of the light transmitted through the pressure sensitive element varies as a function of wavelength to form a minimum corresponding to a predetermined pressure. The light passes through a second polarizer and then is transmitted to a dispersing means to provide for a digital output in which the wavelength of the output intensity is dependent on the pressure to be monitored.

The device of the Tomlinson, et al. patent requires the use of dual fiber-optic transmission lines to transmit the light to and from the sensor. In addition, the disclosed apparatus identifies a minimum or a single dip in the wavelength spectrum of the transmitted light.

The relevance of the prior art indicated in the present specification should not be given a limited interpretation. A cited prior art item may be found to have relevance in a passage other than the one referred to or to have relevance in a sense different than as stated.

SUMMARY OF THE INVENTION

The present invention involves an optical device for monitoring pressure comprising a light generating means for generating polychromatic light traveling in a path. The device further comprises a pressure sensitive means for modifying the polychromatic light in response to an applied pressure to produce a plurality of intensity bands in the polychromatic light. A signal processing means for comparing the input light to the output light is provided. Finally, the device comprises a transport means for transporting the polychromatic light from the light generating means to the pressure sensitive means and for transporting the light from the pressure sensitive means to the signal processing means.

OBJECTS OF THE INVENTION

It is a general object of the present invention to provide an optical pressure sensor for use in high pressure, high temperature environments.

It is another object of the present invention to provide an optical pressure sensor which is insensitive to changes in temperature.

It is a further object of the present invention to provide an optical pressure sensor which is insensitive to broad band optical losses in the system.

It is yet another object to provide an optical sensor which has high resolution in the range of pressures from 5,000 psi to 10,000 psi.

It is still another object of the present invention to provide a stable and reliable optical pressure sensor.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

DESCRIPTION OF THE PREFERRED EMBODIMENT

Figure 1:
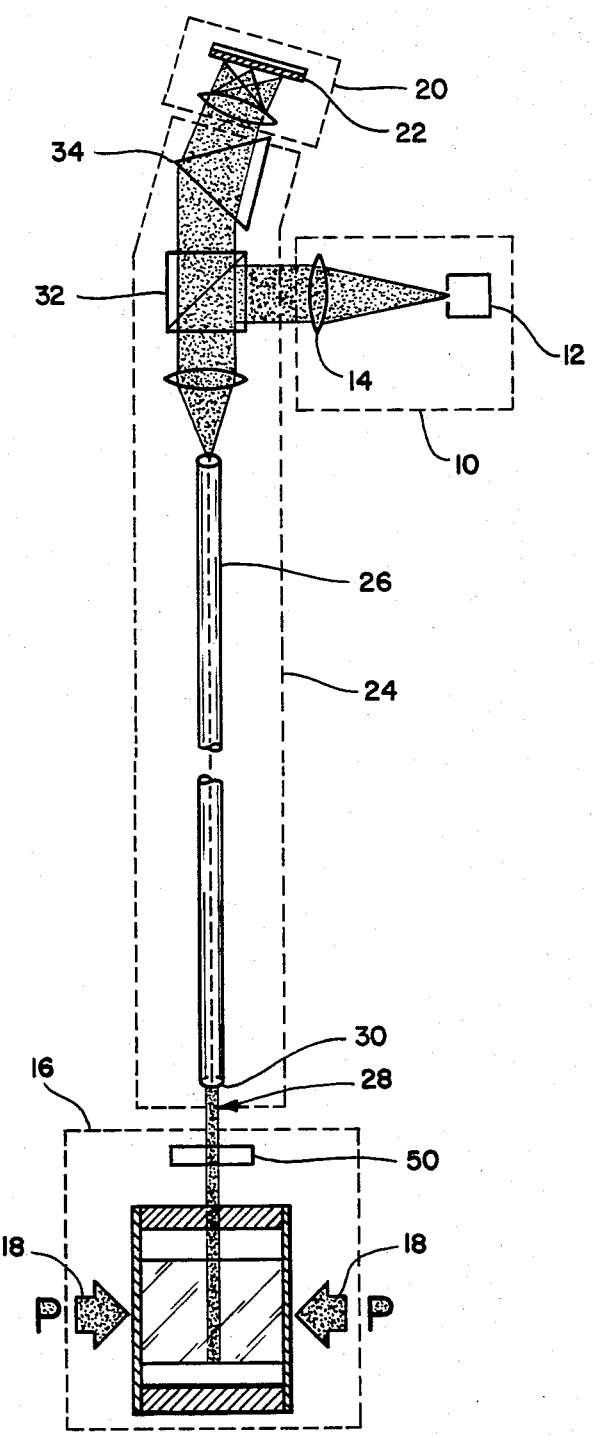
FIG. 1 is a schematic representation of the novel optical pressure sensor used in a pressure sensing system.

Whereas the invention may be implemented in optical pressure sensing systems of various types, it is preferably embodied in the system depicted in FIG. 1. The novel optical sensor utilized in the FIG. 1 system is ideally suited for use in high temperature, high pressure environments. Such environments are typically found in oil wells below the ocean floor. The novel optical sensor is insensitive to temperature for temperatures of 200 degrees centrigrade and has a resolution of up to 1 psi in a 5,000 psi to 10,000 psi pressure range. As depicted in FIG. 1, the optical device for monitoring pressure comprises a light generating means 10 for generating polychromatic light traveling in a path. The light generating means 10 includes a light source 12 and a collimator 14 for producing collimated polychromatic light. The optical device also comprises a pressure sensitive means 16 for modifying the polychromatic light in response to an applied pressure 18 to produce wavelength dependent variations in the intensity of the polychromatic light. A signal processing means 20 is provided for comparing the polychromatic light with the modified polychromatic light. The signal processing means 20 includes a plurality of photodiodes 22 which creates electrical signals which vary in response to the amount of modification produced by the pressure sensitive means 16 upon the polychromatic light. Finally, the optical device comprises a transport means 24 for transporting the polychromatic light from the light generating means 10 to the pressure sensitive means 16 and for transporting light from the pressure sensitive means 16 to the signal processing means 20.

In the preferred embodiment as depicted in FIG. 1, the transport means 24 includes a single multimode waveguide 26 such as a multimode optical fiber. The transport means 24 further includes a focusing lens 28 adjacent the pressure sensitive means 16. In the preferred embodiment, the multimode optical fiber includes a focusing lens integral with one end 30 of the waveguide 26 adjacent the photosensitive means 16. The transport means further includes a beam splitter 32 for receiving the polychromatic light from the light generating means 10 and directing the polychromatic light through the multimode waveguide 26 and the lens 28 to the pressure sensitive means 16. The beam splitter 32 also directs the polychromatic light received from the pressure sensing means 16 to a dispersing element 34 for dispersing the reflected light onto the plurality of photodiodes 22.

Figure 2:
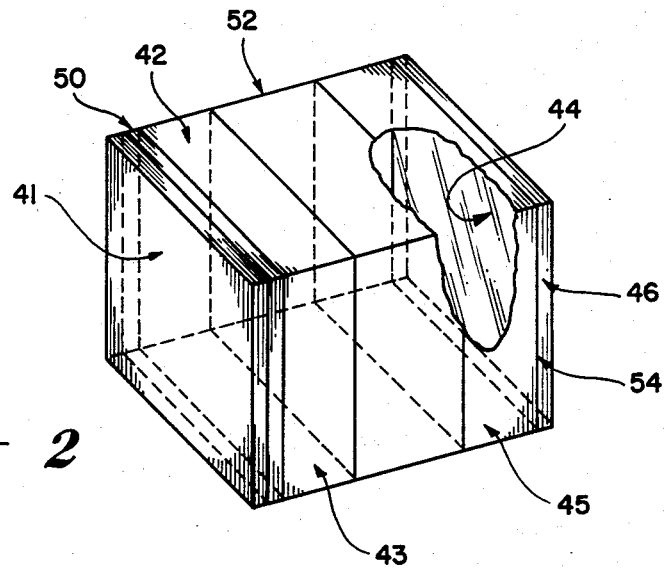
FIG. 2 is a prospective view depicting the elements of the optical pressure sensor.

Although the pressure sensing means 16 may take on any number of different configurations in the preferred embodiment, the pressure sensitive means 16 generally is configured as a hollow cube as shown in FIG. 2. The pressure sensitive means 16 has an outer housing of glass to eliminate the effects due to differential expansion which occur when dissimilar materials are used. The outer housing has a first wall 41 for admitting the polychromatic light into the housing. The housing also includes second and third walls 42 and 43 perpendicular to and integrally attached to opposite ends of the first wall 41. The second and third walls 42 and 43 are capable of flexure in response to changes in pressure. The housing further includes fourth and fifth walls 44 and 45 perpendicular with and integrally attached to opposite ends of the first wall 41. The fourth and fifth walls 44 and 45 are also perpendicular with and integrally attached to one end of each of the second and third walls 42 and 43. A back wall 46 is provided and is parallel to the first wall 41 and integrally attached to the second, third, fourth, and fifth walls 42, 43, 44, and 45, whereby the housing is generally in the form of a hollow cube.

The pressure sensitive means 16 also comprises a polarizer 50 to produce polarized light from the polychromatic light wherein the polarized light is polarized at a 45 degree angle with respect to the second and third walls 42 and 43. The polarizer 50 may be constructed separately and outside of the housing formed by the walls 41, 42, 43, 44, 45, and 46, or in the preferred embodiment may be included within the housing. In the preferred embodiment, the polarizer 50 is positioned in a plane parallel and adjacent to the first wall 41 and polarizes the polychromatic light in a plane perpendicular to the path of the polychromatic light to create polarized polychromatic light.

Also included in the pressure sensitive means 16 is a phase plate 52 which is subject to uniaxial stress by the pressure to be monitored in a plane of the plate 52 perpendicular to the path of the polychromatic light. The phase plate 52 may be formed of a photoelastic material such that when the uniaxial stress is applied to the phase plate 52, the plane of polarization of the polychromatic light is modified.

Figure 3A:
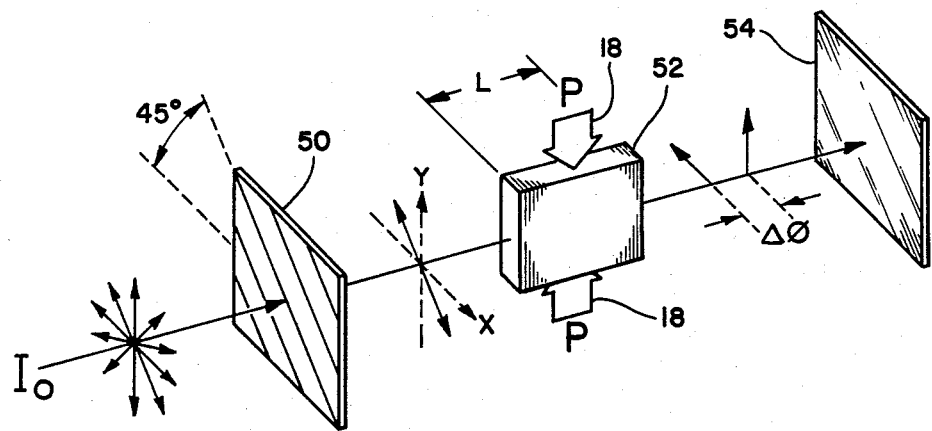
FIGS. 3A and 3B are exploded perspective views illustrating the passage of light through the elements of the pressure sensor.
Figure 3B:
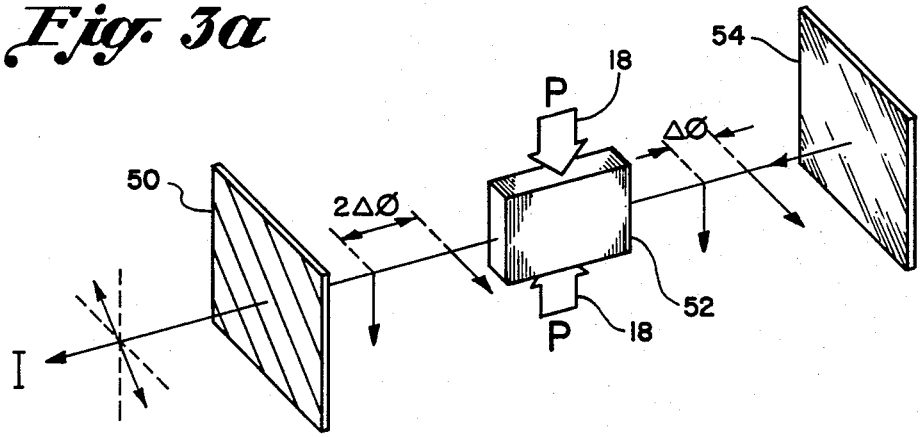

A reflective surface 54 is provided on the sixth wall 46 for receiving and reflecting the modified polarized polychromatic light back through the phase plate 52 a second time to essentially double the modification of the polarized polychromatic light. Alternatively, the reflective surface 54 may be constructed external to the housing. FIG. 3A and FIG. 3B show exploded perspective views of the elements of the pressure sensing means 16. In general, FIG. 3A illustrates the traversing of polychromatic light through the polarizer 50, the phase plate 52, and impinging upon the reflective surface 54. In FIG. 3B, the reflected light is shown leaving the reflective surface 54, traversing the phase plate 52 for a second time and passing through the polarizer 50 for a second time.

A detailed description of the pressure sensing means 16 will now be given. Referring now to FIGS. 1, 2, and 3, light from a broad band source 12 is directed down the multimode optical fiber 26 to the sensor region. As light emerges from the optical fiber 26 at end 30, it is rendered parallel by the lens 28 at the end 30 of the fiber. Light passes through the linear polarizer 50 orientated at 45 degrees to the force axis and then through the phase plate 52 which is uniaxially stressed by the pressure 18 acting on the glass diaphragms, or second and third walls 42 and 43. The effect of the uniaxial compression is to introduce a phase shift between the light polarized parallel and perpendicular to the direction of the applied stress. As a result, the plane of polarization of the light is rotated as it transverses the phase plate 52. The degree of rotation is different for each wavelength of color because the phase shift is inversely proportional to wavelength and directly proportional to the index of refraction which is wavelength dependent in a dispersive medium. The light is then reflected from the reflecting surface 54 back through the phase plate 52 causing an additional wavelength dependent rotation of the plane of polarization. The polarizer 50 acts as an analyzer for the return liht and causes wavelength dependent intensity banding in the light it transmits. This results because any wavelength which is rotated by a total of $\pi/2$ or some odd multiple of $\pi/2$ will be blocked by the polarizer 50 acting as an analyzer. Those wavelengths which are rotated by some integer multiple of $\pi$ will be completely transmitted by an ideal analyzer. Wavelengths between these two extremes will be partially transmitted depending on the degree of rotation. After emerging from the polarizer 50, the light is refocused by the lens 28 into the optical fiber 26 and transmitted back to the dispersing element 34, where it is separated into its various colors and focused onto an array of photodiodes 22. The pressure can then be deciphered from the unique code provided by the output of the diode array 22.

The operation of the sensor will now be explained. The intensity I transmitted by the polarizer 50 oriented at 45 degrees to the direction of the applied force (see FIG. 3A) is given by:

$$I = I_o[1 + \cos \Delta\phi]/2$$

where $I_o$ is the intensity of the light incident on the polarizer 50 and $\Delta\phi$ is the relative phase retardation induced by the stress. Note that a lossless system and a perfect polarizer 50 are assumed. The relative phase retardation is given by:

$$\Delta\phi = 2\pi \Delta n (2L)/\lambda$$

where L is the length of the stressed phase plate 52 and $\Delta n$ is the difference in index of refraction between the y and x axes:

$$\Delta n = |n(y) - n(x)|$$

If one allows for changes in index due to both temperature and pressure, then $$n(y) = n + (dn/dT)T - n^3 P_{12} P/2Y$$

and $$n(x) = n + (dn/dT)T - n^3 P_{11} P/2Y$$

where Y is Young's modulus and $P_{12}$ and $P_{11}$ are photoelastic constants. Therefore:

$$\Delta n = -n^3(P_{12} - P_{11})P/2Y$$

Note that $\Delta n$ is independent of temperature. The intensity I then becomes $$I = I_o[1 + \cos (2\pi n^3(P_{12} - P_{11})PL/Y\lambda)]/2$$

For fused silica $(P_{12} - P_{11}) = 0.15$ and $Y = 1.02 \times 10^7$ psi, and therefore:

$$I = I_o[1 + \cos (9.29 n^3(\lambda)P(psi)L(cm)/\lambda(\text{Å}))]/2$$

The index of refraction of fused quartz varies as a function of wavelength due to dispersion and the wavelength dependence is obtained by fitting Sellmeier's equation to the dispersion data ($\lambda = 4046.56$ Å, $n = 1.46968$ and $\lambda = 7065.20$ Å, $n = 1.45517$) to obtain:

$$n(\lambda) = [1 + 1.09791\lambda^2/(\lambda^2 - (935.908)^2)]^{\frac{1}{2}}$$

Figure 4A:
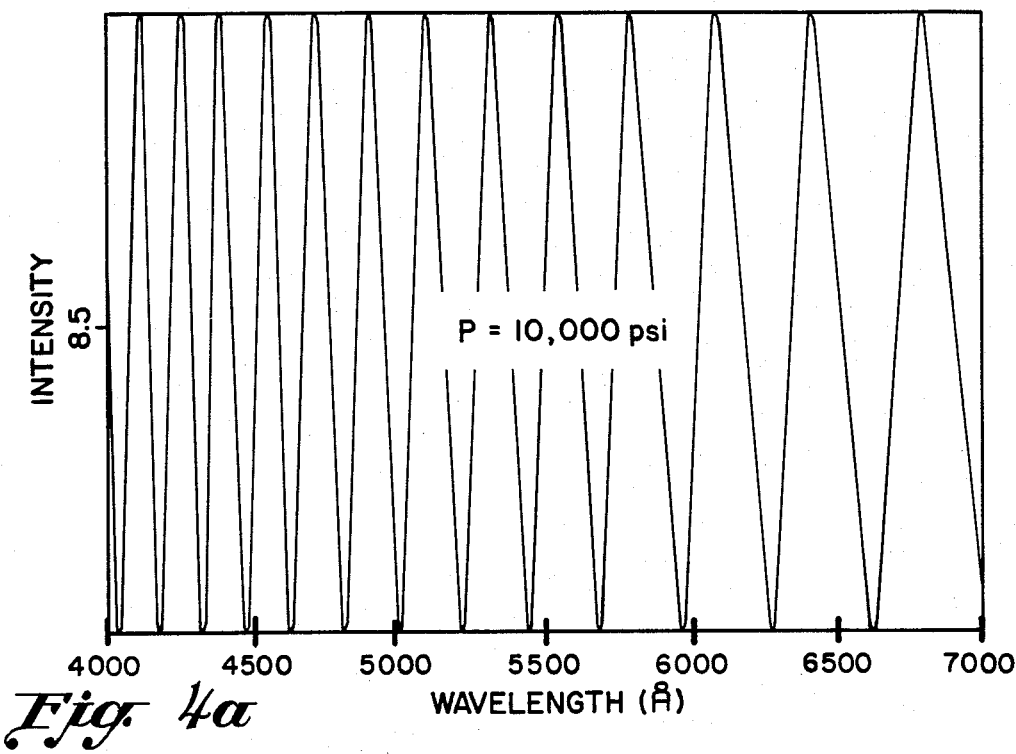
FIGS. 4A and 4B are graphs illustrating the spectrum of the output light as detected from the optical pressure sensor, and illustrating the change in the spectrum for different measured pressures.
Figure 4B:
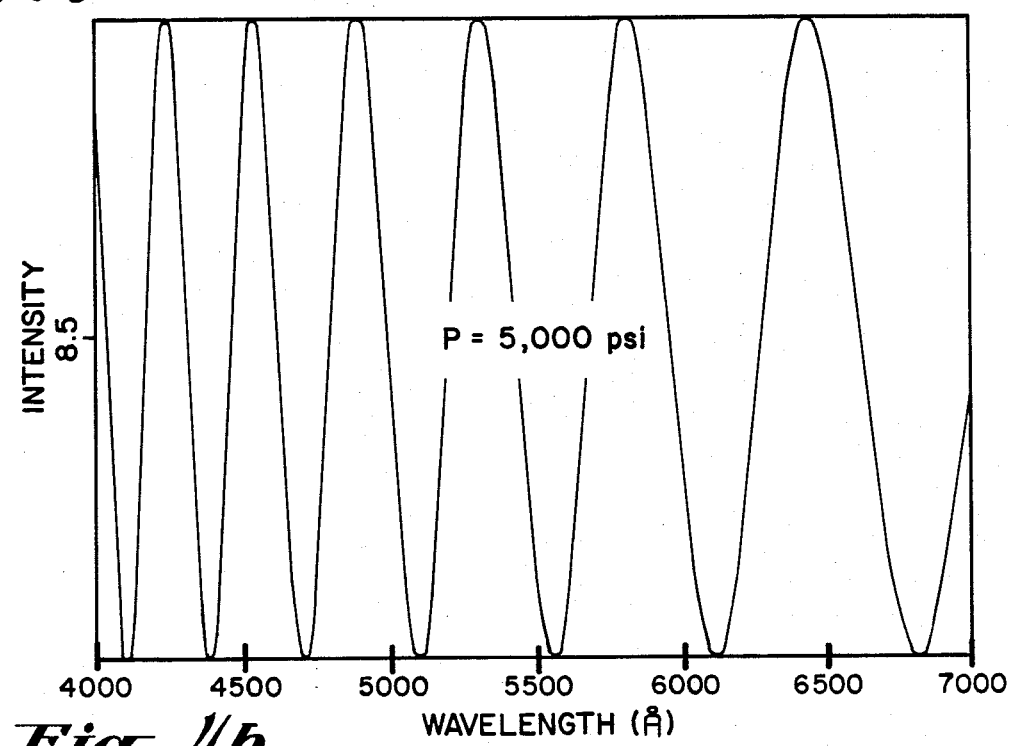

It is now possible to obtain a plot of the banded intensity as a function of wavelength. Such a plot is shown in FIG. 4A for P = 5000 psi and FIG. 4B for P = 10,000 psi assuming that L = 2.54 cm and $I_o = 1$ for all wavelengths. As this figure shows, for a given pressure, the separation between intensity peaks increases as $\lambda$ increases. This is because both $n(\lambda)$ and $1/\lambda$ in the argument of the cos term decreases as $\lambda$ increases. As the pressure increases, the number of peaks increases. This increase is roughly a factor of two from 5,000 psi to 10,000 psi. It can be shown that the intensity pattern obtained is nonrepeating as a function of pressure and hence the pattern obtained at each pressure is unique.

There are several possible schemes for interpreting the wavelength distribution of intensity to determine the pressure. In the preferred embodiment, the following scheme will be used to obtain an estimate of the minimum detectable pressure change.

Figure 5A:
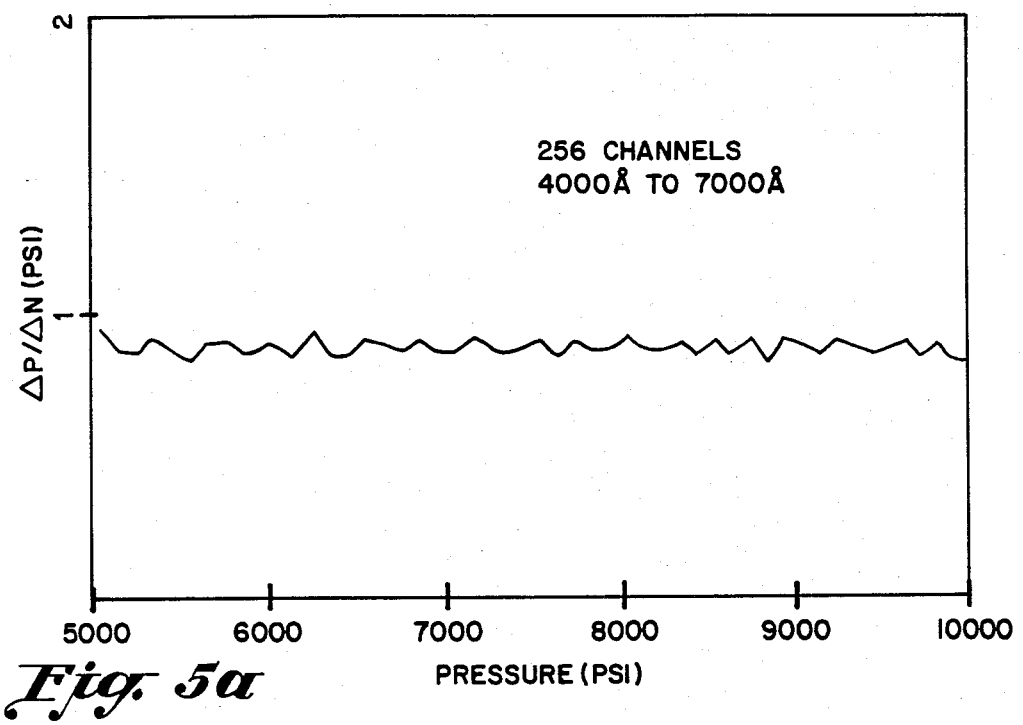
FIGS. 5A and 5B are graphs illustrating the minimum detectable pressure over a range of pressures.
Figure 5B:
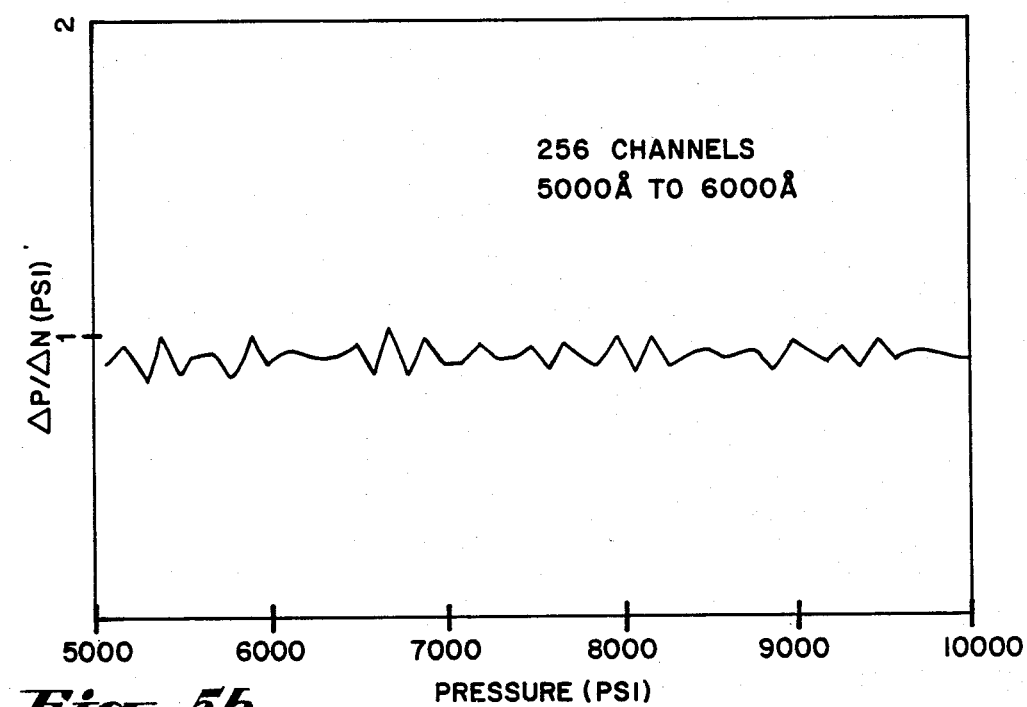

Assuming that the photodiode detector array 22 has 256 detectors which are equally spaced with respect to wavelength, and also assuming that each detector has a threshold of $0.5 I_o$ such that if $I(\lambda) \geq 0.5 I_o$ then the detector circuitry exhibits a binary one and if $I(\lambda) < 0.5 I_o$ then it exhibits a binary zero, then, for any particular pressure, the output of the detector array will consist of a unique patten of ones and zeroes. The minimum detectable pressure will then be determined by the change in pressure, ($\Delta P$), divided by the number of channels, ($\Delta N$), which have different binary assignments for the two pressures. FIGS. 5A and 5B show a plot of $\Delta P/\Delta N$ versus P for the 256 channels spread over both a 3000 Å range (4000 Å to 7000 Å) and a 1000 Å range (5000 Å to 6000 Å). In both cases the minimum detectable pressure change is on the order of one psi and is essentially independent of pressure.

The foregoing treatment represents an idealized analysis of the pressure sensor. The following components are used in the preferred embodiment of the invention.

An ideal light source for this application would have high intensity which is constant over a large wavelength range. The high intensity is necessary to overcome the high losses in the optical fiber. The flatness of output with wavelength is not critical since some compensation can be obtained in the signal processing. The source which most closely satisfies the requirements is a suitably filtered Xenon flash lamp.

The choice of optical fiber is determined by its cost, optical losses, and transmission characteristics. Multimode optical fiber should be adequate for this application. Typical loss values are in the range of 5 db/km and hence the transit loss over a 30,000 foot length wil be about 50 db. This high loss will impact the choice of both source and detector to obtain a suitable signal to noise ratio.

The lens at the fiber end is necessary to give collimated light for the sensor and to refocus the returning light back into the fiber. An all fiber implementation of this sensor would not require such a lens. Micro lenses are commercially available and, in addition, the possibility exists of forming the lens on the tip of the fiber.

The polarizer must have a moderate extinction ratio and must not be affected by the temperature and pressure. The most likely candidates are either crystal polarizers or polarizing prisms made of glass.

The entire sensor housing and phase plate will be constructed out of glass to eliminate the effects due to differential expansion which occur when dissimilar materials are used. In addition, glass should be stable in the temperature/pressure environment over a long period of time. Careful design of the diaphragm and housing will be required to allow sufficient flexure of the diaphragms while at the same time withstanding the high pressures. The mirror in the sensor can be a metal film on the inside of the back wall of the sensor housing. In the preferred embodiment, this sensor is approximately an inch in length with the lateral dimensions determined only by the size of the plates necessary to make the pressure enclosure.

The beam splitter serves to direct the input light down the fiber and to direct the return light to the dispersive element. It can be either a bulk component or an optical fiber coupler.

The dispersive element as well as all other components at the sea floor (light source, diode array, signal processing electronics, etc.) will be maintained at a fairly stable and benign temperature and hence do not have to be designed for temperature stabilization. In this case, a simple prism or grating should be suitable for the dispersive element.

In the example treated here, it was assumed that the photodiode array had 256 channels. Diode arrays are commercially available with over 4,000 diodes in a linear array. Since the 256 channel array appears to give adequate pressure resolution, there appears to be a large degree of latitude in choosing the array configuration to optimize the system performance.

In the example given above, a simple binary scheme was described for deciphering the pressure from the wavelength dependent intensity of the returned light. More sophisticated signal processing schemes are also possible. For example, if the detector diodes are polled sequentially at a high repetition rate, then the resulting signal received by the electronics will be a high frequency chirp which replicates the optical pattern. Standard FM techniques can then be used to demodulate the signal. By suitable choice of the dispersive element and the arrangement of the detector array, it may also be possible to obtain a pure frequency by the repetitive sequential polling technique. Each pressure would then be assigned to a particular frequency.

The invention is not limited to the particular details of the apparatus depicted and other modifications and applications are contemplated. Certain other changes may be made in the above-described apparatus without departing from the true spirit and scope of the invention herein involved. It is intended, therefore, that the subject matter in the above depiction shall be interpreted as illustrative and not in a limiting sense.

What is claimed is:

1. An optical device for monitoring pressure comprising:
   (a) light-generating means for generating polychromatic light traveling in a path;
   (b) pressure-sensitive means for modifying said polychromatic light in response to an applied pressure to produce wavelength dependent intensity variations of the polychromatic light said pressure-sensitive means having an integral all-glass outer housing;
   (c) signal processing means for comparing said polychromatic light with said wavelength dependent intensity variations of polychromatic light; and
   (d) transport means for transporting said polychromatic light from said light generating means to said pressure-sensitive means and for transporting light from said pressure-sensitive means to said signal-processing means.

2. An optical device for monitoring pressure as recited in claim 1 wherein said pressure-sensitive means includes an outer housing having at least a first wall for admitting said polychromatic light into said housing.

3. An optical device for monitoring pressure as recited in claim 2 wherein said housing also includes second and third walls perpendicular to and integrally attached to opposite ends of said first wall, said second and third walls capable of flexure in response to changes in pressure.

4. An optical device for monitoring pressure as recited in claim 3 wherein said housing further includes fourth and fifth walls perpendicular with and integrally attached to opposite ends of said first wall, said fourth and fifth walls also perpendicular with and integrally attached to one end of each of said second and third walls, said housing further including a sixth wall parallel to said first wall and integrally attached to said second, third, fourth, and fifth walls whereby said housing is generally in the form of a hollow cube.

5. An optical device for monitoring pressure as recited in claim 4 wherein said pressure-sensitive means further includes a polarizer means to produce polarized light from said polychromatic light said polarized light being polarized at a 45 degree angle with respect to said second and third walls.

6. An optical device for monitoring pressure as recited in claim 1 wherein said pressure-sensitive means further includes a phase plate in said housing, said phase plate being subject to uniaxial stress by the pressure to be monitored in a plane of said plate perpendicular to said path of said polychromatic light.

7. An optical device for monitoring pressure as recited in claim 6 wherein said housing further includes a polarizer within said housing, said polarizer being positioned in a plane parallel to and adjacent said first wall and polarizing said polychromatic light in a plane perpendicular to said path of polychromatic light to create polarized polychromatic light.

8. An optical device for monitoring pressure as recited in claim 6 wherein said phase plate is formed of a photoelastic material such that when said uniaxial stress is applied to said phase plate, said polychromatic light is modified to cause wavelength-dependent intensity banding.

9. An optical device for monitoring pressure as recited in claim 8 wherein said housing further includes a reflective surface for receiving and reflecting said modified polarized polychromatic light to direct reflected light back through said phase plate a second time to essentially double the modification of said polarized polychromatic light through said phase plate.

10. An optical device for monitoring pressure as recited in claim 9 wherein said transport means includes a single multimode waveguide.

11. An optical device for monitoring pressure as recited in claim 10 wherein said multimode waveguide is a multimode optical fiber.

12. An optical device as recited in claim 11 wherein said multimode optical fiber includes a focusing lens integral with one end of said fiber adjacent said pressure-sensitive means.

13. An optical device for monitoring pressure as recited in claim 10 wherein said modified polarized polychromatic light reflected back through said phase plate is directed through said single waveguide to said signal processing means.

14. An optical device for monitoring pressure as recited in claim 9 wherein said reflected light is directed through said transport means after passing through said phase plate said second time, said reflected light directed by said transport means to said signal processing means.

15. An optical device for monitoring pressure as recited in claim 14 wherein said transport means includes a single multimode waveguide, said transport means further including a beam splitter for receiving said polychromatic light from said light-generating means and directing said polychromatic light through said transport means to said pressure-sensitive means, said signal processing means further including a plurality of photodiodes, said transport means further including dispersing means to receive said reflected light and disperse said reflected light on said plurality of photodiodes.

16. An optical device as recited in claim 15 wherein said plurality of photodiodes creates electrical signals which vary in response to the amount of modification produced by said phase plate upon said polychromatic light.

* * * * *